United States Patent
Epitaux et al.

(10) Patent No.: US 7,187,486 B2
(45) Date of Patent: Mar. 6, 2007

(54) ELECTROMECHANICAL DRIVES ADAPTED TO PROVIDE TWO DEGREES OF MOBILITY

(75) Inventors: Marc Epitaux, Sunnyvale, CA (US); Wilfried Noell, Neuchâtel (CH); Yves Pétremand, Neuchâtel (CH); Nicolaas-F. De Rooij, Neuchâtel (CH)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/832,655

(22) Filed: Apr. 27, 2004

(65) Prior Publication Data

US 2005/0237597 A1    Oct. 27, 2005

(51) Int. Cl.
    *G02B 26/00*    (2006.01)
(52) U.S. Cl. ........................................ 359/290; 359/292
(58) Field of Classification Search ................ 359/290, 359/223, 224, 226, 292, 295, 298; 385/16, 385/18; 310/309
    See application file for complete search history.

(56) References Cited

U.S. PATENT DOCUMENTS

| | | | |
|---|---|---|---|
| 4,379,624 A | 4/1983 | Miller et al. | |
| 4,775,815 A | 10/1988 | Heinz | |
| 4,831,333 A | 5/1989 | Welch | |
| 4,917,484 A | 4/1990 | Heinz | |
| 5,025,346 A * | 6/1991 | Tang et al. ............... | 361/283.1 |
| 5,576,948 A | 11/1996 | Stern et al. | |
| 6,541,892 B2 * | 4/2003 | Hoen ......................... | 310/309 |
| 6,546,801 B2 * | 4/2003 | Orsier et al. ............. | 73/514.38 |
| 6,624,548 B1 | 9/2003 | Miller | |
| 6,664,786 B2 * | 12/2003 | Kretschmann et al. ...... | 324/259 |
| 6,665,111 B2 | 12/2003 | Sundaram | |
| 6,713,367 B2 * | 3/2004 | Solgaard et al. ............ | 438/459 |
| 6,806,991 B1 * | 10/2004 | Sarkar et al. ............... | 359/290 |
| 6,809,907 B1 * | 10/2004 | Vigna et al. ............. | 360/294.3 |
| 6,819,822 B2 * | 11/2004 | Behin et al. .................. | 385/18 |
| 6,914,710 B1 * | 7/2005 | Novotny et al. ............ | 359/291 |
| 2002/0101573 A1 | 8/2002 | Ishibashi | |
| 2004/0027029 A1 | 2/2004 | Borwick | |

FOREIGN PATENT DOCUMENTS

| | | |
|---|---|---|
| EP | 0 903 606 A | 3/1999 |
| EP | 1 174 994 A | 1/2002 |

OTHER PUBLICATIONS

Microlens 2D Scanners by Photoresist Reflow Technique, Toshiyoshi, H., Institute of Industrial Science, Univ. of Tokyo, Jun. 2001.
AFM imaging with an xy-micropositioner with integrated tip, P.-F. Indermühle et al., Sensors and Acuators A, vol. 46-47 1995.
Microelectromechanical Systems Laboratory, Carnegie Mellon University MEMS Laboratory, date unknown, prior to Apr. 27, 2004.

* cited by examiner

*Primary Examiner*—Timothy Thompson
*Assistant Examiner*—Tuyen Tra
(74) *Attorney, Agent, or Firm*—Schwabe, Williamson & Wyatt, P.C.

(57) ABSTRACT

An electromechanical system having an object and drives adapted to cooperate to provide the object with two degrees of mobility is described herein.

30 Claims, 5 Drawing Sheets

ELECTROMECHANICAL DRIVES ADAPTED TO PROVIDE TWO DEGREES OF MOBILITY

FIELD OF THE INVENTION

The present invention relates generally to the field of electromechanical systems, and in particular, to electromechanical drive arrangements.

BACKGROUND OF THE INVENTION

Advances in photolithography processes have enabled electromechanical systems, e.g. micro-electromechanical systems (MEMS) to have extremely small features. It is not uncommon for these features to have dimensions in order of micrometers. Further, notwithstanding their small dimensions, they nonetheless have well-controlled geometric properties. Resultantly, it has become possible to insert MEMS into a variety of applications. For examples, pressure sensors are being integrated with automotive tires to provide real time monitoring of tire pressure, micro-machined drug delivery systems are being considered for use as implantable smart drug capsules, micro inertia sensors are being used for smart projectiles to automatically adjust the trajectory for gun jump and wind factors, and micro-machined digital propulsion is finding applications in controlling the positions of micro satellites.

Additionally, micro mechanical structures and active components are integrated with electronic components (e.g. signal processing circuits), sensors (temperature, pH sensors, etc.), optics, fluid components (e.g. fluid channels, micro pumps, micro valves), and high performance chemical analytical systems (e.g. electrophoresis) to realize comprehensive functional integration in "smart" sensors and actuators.

Further, technology has advanced to a point where mobile micro mechanisms with one dimension linear translation motion capability have been provided.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, an electromechanical drive arrangement providing 2 degrees of mobility, and a system incorporated with the electromechanical drive arrangement.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

The phrase "in one embodiment" is used repeatedly. The phrase generally does not refer to the same embodiment; however, it may. The terms "comprising", "having" and "including" are synonymous, unless the context dictates otherwise.

Further, while the present invention will be described in terms of micro-electromechanical embodiments, the present invention is not limited, and may be practiced in other scales, e.g. at the nano scale level.

Figure 1:
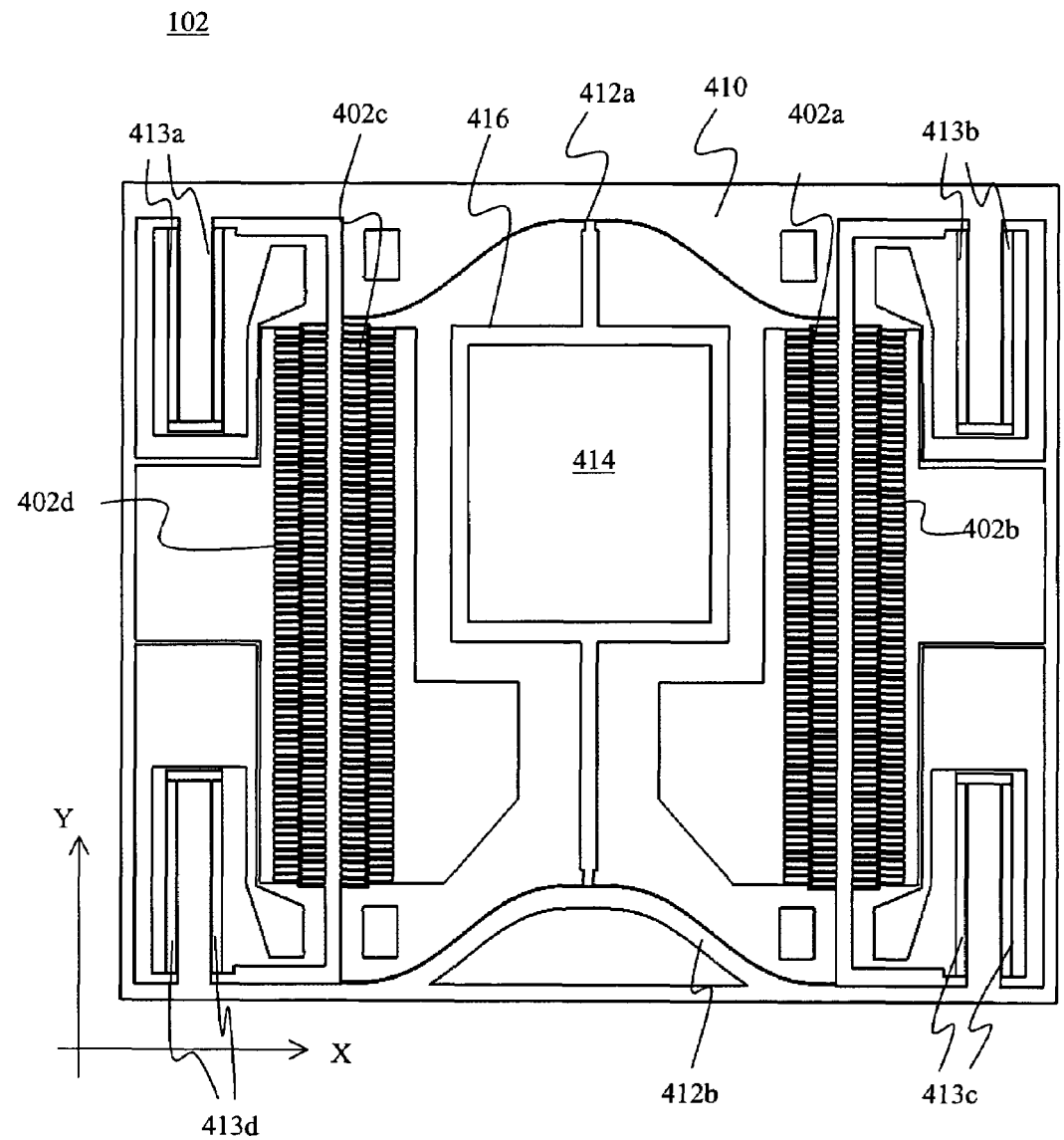
FIG. 1 illustrates a top view of a MEMS with a micro drive arrangement with 2 degrees of mobility, in accordance with an embodiment of the present invention.

Referring now to FIG. 1, wherein a top view of a MEMS having a drive arrangement adapted to provide 2 degrees of mobility, in accordance with one embodiment is shown. As illustrated, for the embodiment, MEMS 102 includes micro-object 414 and a drive arrangement including micro drives 402a–402d, coupled to each other as shown. As will be described in more detail below, micro drives 402a–402d are adapted to selectively cooperate with one another to provide micro-object 414 with two degrees of mobility, more specifically, for the embodiment, a first degree of mobility along the X/–X direction, and a second degree of mobility along the Y/–Y direction. In particular, various pairs of the micro drives 402a–402d, e.g. micro drives 402b–402c, micro drives 402a–402d, micro drives 402a–402c or micro drives 402a–402d may be complementarily activated to provide the two degrees of mobility, e.g. X with Y/–Y, –X with Y/–Y, Y with X/–X, or –Y with X/–X.

The directions of mobility are referred to as X/–X and Y/–Y direction for ease of understanding. However, the references should not be read as limiting on the invention, as the mobility may be referred to as Z or other directions, depending on the point of view for describing MEMS 102. Likewise, the references to any view as a top view, a side view, and so forth, are also for ease of understanding. Each view could have been referenced differently, if the description is presented from a different point of view. Thus, the view references are also not to be read as limiting to the invention.

Continuing to refer to FIG. 1, for the embodiment, MEMS 102 further includes stage 416, on which micro-object 414 is disposed. Micro-object 414 may be integrally formed on stage 416, or attached to stage 416. Additionally, for the embodiment, MEMS 102 includes compliant suspension beams 412a–412b, to which stage 416 (and therefore, micro-object 414) is attached. For the embodiment, compliant suspension beams 412a–412b are substantially elongated as well as curved in shape. Further, micro drives 402c and 402d are coupled to one end of compliant suspension beams 412a–412b, while micro drives 402c and 402d are coupled to the other end of compliant suspension beams 412a–412b.

Micro drives 402b and 402c are adapted to be activatable complementarily to move compliant suspension beams 412a–412b in a coordinated manner, and therefore, micro-object 414, a distance along the X direction, whereas micro drives 402a and 402d are adapted to be activatable complementarily to move compliant suspension beams 412a–412b in an opposite coordinated manner, and therefore, micro-object 414, a distance along the −X direction.

Additionally, micro drives 402a and 402c are adapted to be activatable complementarily to compress compliant suspension beams 412a–412b, to move micro-object 414 a distance along the Y direction, whereas micro drives 402b and 402d are adapted to be activatable complementarily to extend compliant suspension beams 412a–412b, to move micro-object 414 a distance along the −Y direction.

For the embodiment, MEMS 102 is designed to have micro object 414 to be positioned substantially at the center of substrate 410, when it is not moved for any amount of distance in either the X/−X or Y/−Y directions. For ease of understanding, this position will be referred to as the "initial" position. In alternate embodiments, the "initial" position may be off-centered.

In various embodiments, the distance moved is a function of the activation intensity of the facilitating micro drive. Accordingly, it is possible to achieve movements in two directions, by complementarily activating two cooperating micro drives with different intensities. In various embodiments, each of micro drives 402a–402d may be independently activated with the same or different intensities. Note that a desired difference in intensities may be effectuated by activating a pair of micro drives with different intensities having the difference, including activating one of the two micro drive with an intensity equals to the difference, and "activating" the other micro drive with zero intensity. Accordingly, the term "complementary activation" as used herein, including the claims, include the "zero" form of "activation", with one of the micro drives "activate" with a zero intensity.

In various embodiments, MEMS 102 may further include a number of springs 413a–413d to which micro drives 402a–402d are coupled. Springs 413a–413d may be attached to substrate 410. For the embodiment, springs 413a–413d are also substantially elongated in shape, disposed substantially in parallel with micro drives 402a–402d.

In various embodiments, each of micro drives 402a–402d includes at least two portions, at least one of which is adapted to be linearly moveable towards the other. In various embodiments, the other portion is fixed to substrate 410 through corresponding ones of springs 413a–413d. Further, in various embodiments, the moveable portion is linearly moved towards the fixed portion electrostatically, that is when the drive is electrically energized. The amount of movement is a function of the intensity a micro drive is electrically energized.

Substrate 410 may be formed of a wide range of substrate materials, including but are not limited to, silicon, silicon-on-insulator, and so forth. Stage 416 may be formed of a wide range of materials, including but are not limited to ceramic materials or semiconductor materials like silicon.

Micro object 414 may be any micro object where at least 2 degrees of mobility are desired. Examples of micro object 414 include, but are not limited, microlens, mircomirrors, and so forth.

As described earlier, micro object 414 is attached to compliant suspension beam 412a–412b, which may comprise one or more layers of e.g. one or more metals or their alloys with compliant properties. Such metals include, but are not limited to, copper (CU), titanium (Ti), nickel (Ni), Gold (Au), silver (Ag), tantalum (Ta), molybdenum (Mo), chromium (Cr), cobalt (Co), Silicon (Si) and so forth. Resultantly, compliant suspension beams 412a–412b may be compressed to provide micro object 414 with mobility for a distance along the +Y direction, or extended (stretched) to provide micro object 414 with mobility for a distance along the −Y direction. Similarly, springs 413a–413d may be formed with one or more layers of metals or alloys with compliant properties, including but not limited to the earlier enumerated metals.

Figure 2:
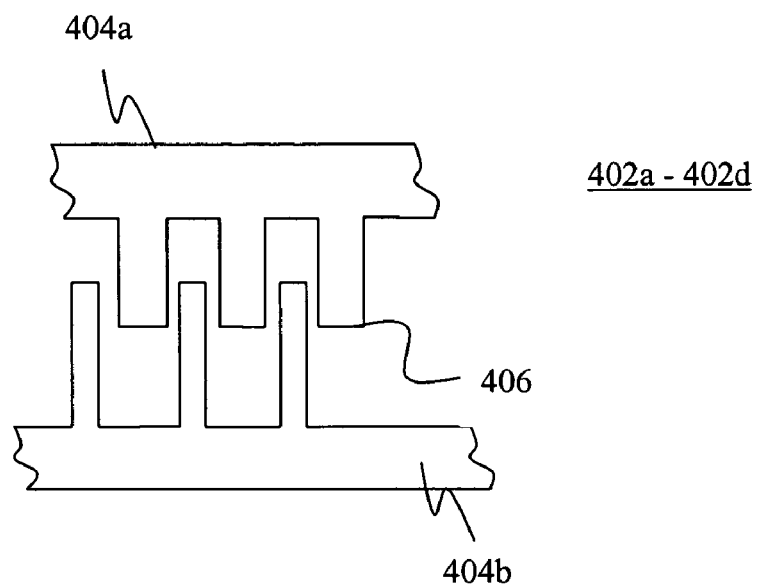
FIG. 2 illustrates a zoom in view of a portion of one of the micro drives of FIG. 1, in accordance with one embodiment.

Referring now also to FIG. 2, where a zoom in view of one of the micro drives, in accordance with various embodiments, is shown. For these embodiments, each of micro drives 402a–402d is a comb drive comprising of two portions 404a–404b, and each portion having a number of fingers 406. One of the two portions 404a–404b is substantially "affixed" to substrate 410 (through corresponding ones of springs 413a–413d), and the other portion is coupled to one end of a compliant suspension beam 412a–412b. In various embodiments, each of comb drives 402a 402d operates in accordance with electrostatic principles. That is, when movement is desired of a comb drive 402a–402d, fingers 406 of the two portions 404a–404b of the particular comb drive 402a–402d are complementarily energized, causing the portion 404a/404b coupled to one end of a compliant suspension beam 412a–412b to linearly move towards or away from the substantially "affixed" portion 404b/404a. Accordingly, the portion 404a/404b coupled to springs 413a–413b may also be referred to as the "fixed" portion of a comb drive 402a–402d, while the portion 404a/404b coupled to one end of a compliant suspension beam 412a–412b may also be referred to as the movable portion of the comb drive 402a–402d.

Further, in each case, the amount of movement is substantially dependent on the amount of displacement of the moveable portion 404a/404b towards the "fixed" portion 404b/404a, which is dependent on the level portions 404a–404b are energized. In other words, by controlling the level portions 404a–404b of corresponding micro drives 402a–402d are energized, the distances moved by micro drives 402a–402d, and therefore, micro-object 414 may be controlled. In various embodiments, the level portions 404a–404b of corresponding ones of drives 402a–402d may be energized is variable, and may differ from each other. That is, the amount of movements to be effectuated in the X/−X or Y/−Y directions may be variable, concurrent movement in one of X/−X direction and one of Y/−Y direction may be effectuated through one complementary activation of a corresponding pair of micro drives 402a–402d.

Figure 3:
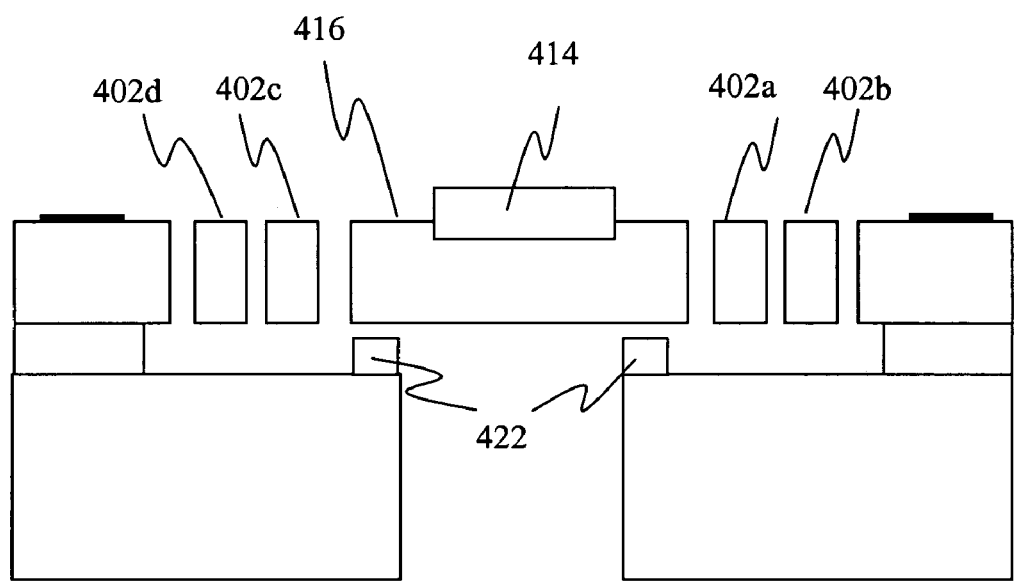
FIG. 3 illustrates a cross sectional view of the MEMS of FIG. 1.

Referring now to FIG. 3, wherein a cross-sectional view of MEMS 102, in accordance with various embodiments, is shown. For these embodiments, MEMS 102 may be further provided with electrode features 422 under stage 416. Electrode features 422 are adapted to be activatable to electrostatically attract stage 416, thereby providing a holding or locking function for holding or locking stage 416, and therefore micro-object 410 in place, after stage 416 (and micro-object 414) have been moved to a desired (e.g. operational) location. In particular, the operation may be performed post assembly or after substantial completion of assembly of a component (e.g. an optoelectonic module) having MEMS 102, during operation. The phrase "substantial completion of assembly" refers to a point in time where the impact or potential impact of further assembly activities on the location/position of the micro-object is considered inconsequential or insignificant with respect to a desired quality or reliability. Accordingly, what constitutes "substantial completion of assembly" (for the purpose of embodiments of the invention), is application dependent. For applications with very high quality or reliability requirement, the point in time may be total completion of all assembly.

In various embodiments, in addition to or in lieu of electrode features 422, one or more regions of substrate may be energized to attract stage 416, thereby effectuating a desired holding or locking in-place function for holding or locking stage 416, and therefore micro-object 410 in place, after stage 416 (and micro-object 414) have been moved to a desired (e.g. operational) location/position.

In alternate embodiments, the holding or lock down function may be effectuated employing other physical principles, including but are not limited to electromagnetic, piezoelectrical bimorph, thermal bimorph, and so forth.

The holding or locking in-place feature is particularly useful in e.g. a microlens application (i.e. micro-object 414 being a micro-lens), for holding or locking the microlens in place, after it has been moved into a desired operational location, e.g. a location where it is in alignment with a light source and an optical fiber. As described earlier, this operation may be performed post assembly or after substantial completion of assembly of an optoelectronic module having MEMS 102. Further, at a later point in time after operated for a while, the holding or locking may be undone, to render the microlens to be moveable again to facilitate re-alignment of the elements. The microlens may be re-locked again after the re-alignment. The unlocking and realignment may be desired due to a change in operational requirement or the elements became misaligned (for whatever reasons). The unlocking, re-alignment, and re-locking process may be repeated any number of times as it is needed. Such a microlens application, or more specifically, a microlens application with the ability to perform the alignment and lock down post assembly of an optoelectronic module is the subject matter of the co-pending application entitled "Movable Lens Beam Steerer," having same inventorship with present invention, and contemporaneously filed under Express Mail No. EU984797833US, on Apr. 27, 2004. Note that the process of operationally positioning a micro-object, locking the micro-object in place, unlocking it and repeating the positioning and locking process is not limited to the microlens application. The process may be practiced for a wide range of other micro-objects where operational re-positioning relative to other elements is desired.

Figure 4:
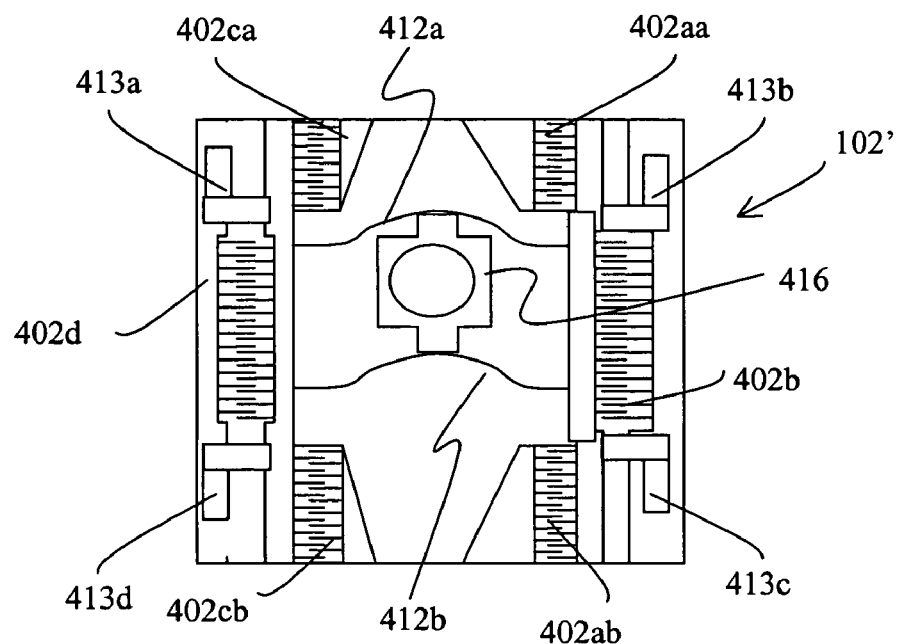
FIG. 4 illustrates a top view of another MEMS with a micro drive arrangement with 2 degrees of mobility, in accordance with another embodiment of the present invention.

Referring now to FIG. 4, wherein a MEMS with a drive arrangement adapted to provide two degrees of mobility, in accordance with an alternate embodiment, is shown. MEMS 102' is substantially the same as MEMS 102 of FIG. 1, with the exception that each of drives 402a and 402c are split into two disjoint and separately disposed sections, drive sections 402aa–402ab, and drive sections 402ca–402cb, respectively. Micro drive sections 402aa and 402ab are coupled to corresponding ends of complaint suspension beams 412a and 412b, whereas micro drive sections 402ca and 402cb are coupled to corresponding opposite ends of complaint suspension beams 412a and 412b.

Micro drive sections 402ca and 402cb are adapted to be activatable complementarily with micro drive 402b to move compliant suspension beams 412a and 412b, respectively, in a coordinated manner, and therefore, micro-object 414, a distance along the X direction (and optionally along one of Y/–Y direction, substantially at the same time), whereas micro drive sections 402aa and 402ab are adapted to be activatable complementarily with micro drive 402d to move compliant suspension beams 412a and 412b, respectively, in an opposite coordinated manner, and therefore, micro-object 414, a distance along the –X direction (and optionally along one of Y/–Y direction, substantially at the same time), as earlier described.

Additionally, micro drive sections 402aa and 402ab and 402ca–402cb are adapted to be activatable complementarily to compress compliant suspension beams 412a and 412b, respectively, in a coordinated manner, to move micro-object 414 a distance along the Y direction (and optionally along one of X/–X direction, substantially at the same time), whereas micro drives 402b and 402d are adapted to be activatable complementarily to extend compliant suspension beams 412a–412b, to move micro-object 414 a distance along the –Y direction (and optionally along one of X/–X direction, substantially at the same time), as earlier described.

Figure 5:
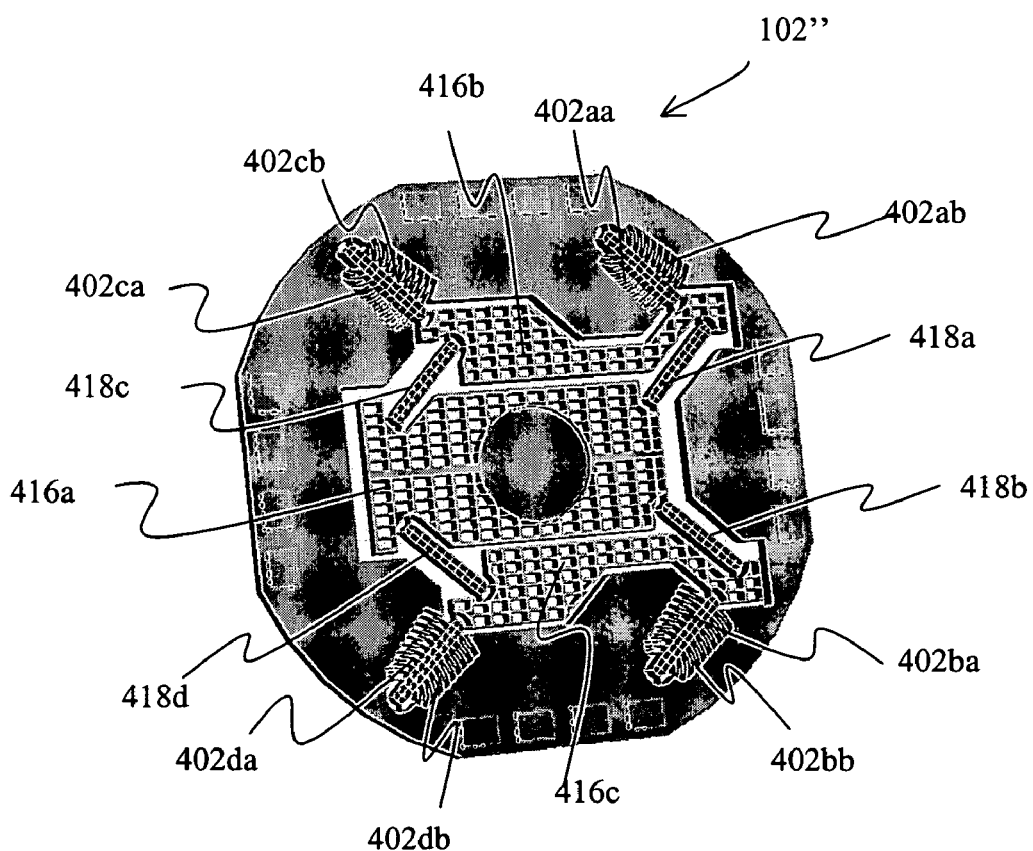
FIG. 5 illustrates a perspective view of another MEMS with a micro drive arrangement with 2 degrees of mobility, in accordance with yet another embodiment of the present invention.
Figure 6A:
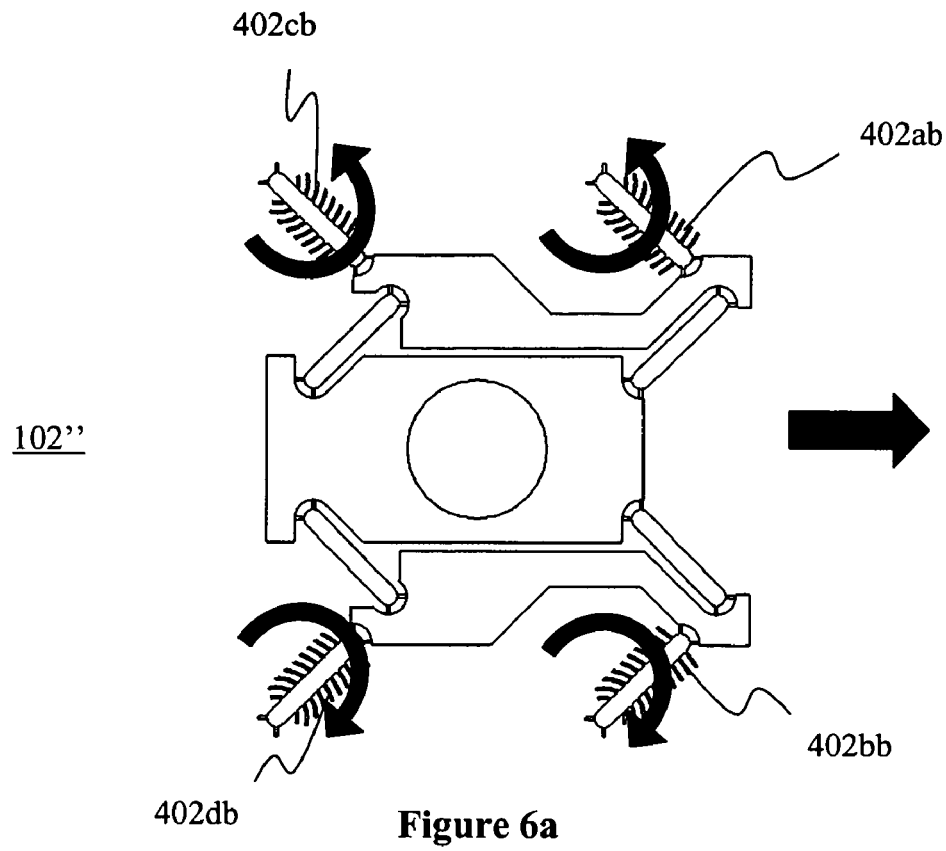
FIG. 6a–6b illustrate the cooperative activation of the micro drives of FIG. 5 in further detail, in accordance with one embodiment.
Figure 6B:
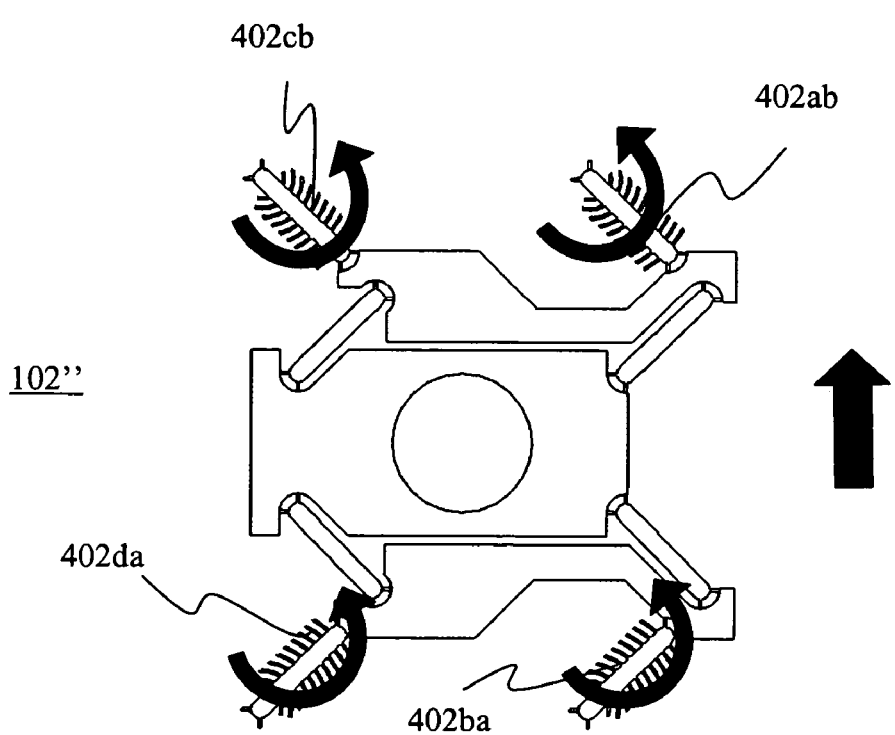

Referring now to FIGS. 5 and 6a–6b, wherein a MEMS with a drive arrangement adapted to provide two degrees of mobility, in accordance with another alternate embodiment, is shown. Principally, MEMS 102" is substantially the same as MEMS 102 of FIG. 1 and MEMS 102" of FIG. 4, with the exception that stage 416 is divided into 3 stages 416a–416c. Microlens is disposed on main stage 416a, which is coupled to the other two stages 416b–416c through moveable arms 418a–418d, which in turn are coupled to micro drive pairs 402a*–402d* (* equals a or b) respectively. Further, each pair of micro drives 402a*–402d* include a "left" micro drive 402aa, 402ba, 402ca and 402da, and a "right" micro drive 402ab, 402bb, 402cb and 402db adapted to be selectively activatable in combination to provide either a counterclockwise motion or a clockwise motion (see FIGS. 6a–6b) as opposed to the substantially linear motion of FIGS. 1 and 4. As clarified earlier for "top", "side" views etc, references to the micro drives as "left" and "right" are also made for ease of understanding, relative to the point of view MEMS 102" is being described, and should not read as limiting on embodiments of the invention.

Micro drives 402a*–402d* are adapted, such that micro drives 402ab and 402cb may be activated (with substantially equal intensities) to provide a counterclockwise motion, while micro drives 402bb and 402db are activated (with substantially equal intensities) to provide a clockwise motion to move arms 418a–418d, in a coordinated manner, and therefore, micro-object 414, a distance along the X direction (FIG. 6a). Likewise, micro drives 402aa and 402ca may be activated (with substantially equal intensities) to provide a clockwise motion, while micro drives 402ba and 402da are activated (with substantially equal intensities) to provide a counterclockwise motion to move arms 418a–418d, in a coordinated manner, and therefore, micro-object 414, a distance along the –X direction. Further, as with the earlier described embodiments, micro drives 402ab and 402cb, 402bb and 402db, 402aa and 402ca, and/or 402ba and 402da may optionally be activated with unequal intensities, to provide movement along one of Y or –Y directions at substantially the same time.

Similarly, micro drives 402ab, 402ba, 402cb and 402da may all be activated (with substantially equal intensities) to provide a counterclockwise motion to arms 418a–418d, in a coordinated manner, and therefore, micro-object 414, a distance along the Y direction (FIG. 6b), and micro drives 402aa, 402bb, 402ca, and 402db may all be activated (with substantially equal intensities) to provide a clockwise motion to move arms 418a–418d, in a coordinated manner, and therefore, micro-object 414, a distance along the −Y direction. Further, as will the earlier described embodiments, micro drives 402ab and 402cb, 402bb and 402db, 402aa and 402ca, and/or 402ba and 402da may optionally be activated with unequal intensities, to provide movement along one of X or −X directions at substantially the same time.

Figure 7:
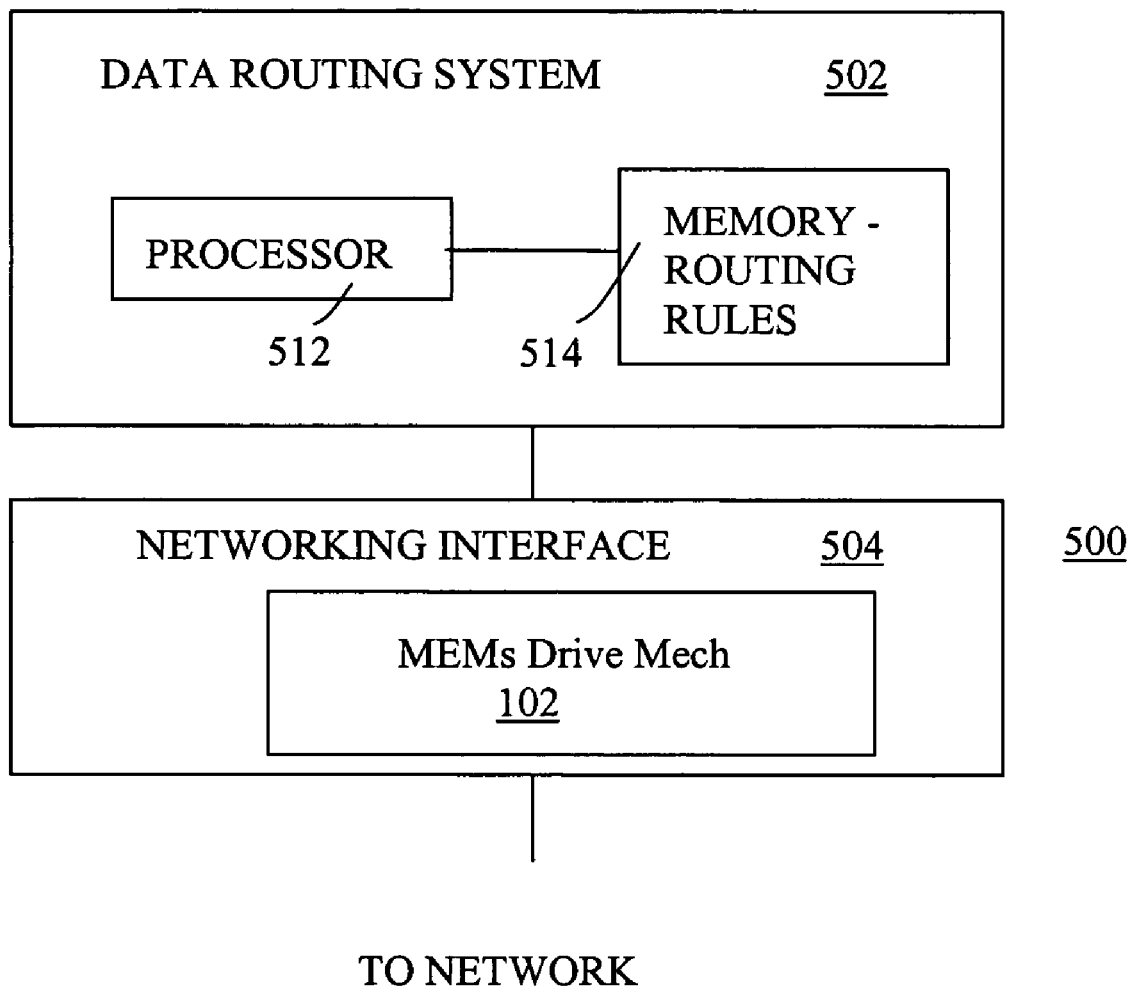
FIG. 7 illustrates an example system having a component incorporated with one or more of the MEMS of FIGS. 1–5, in accordance with one embodiment.

FIG. 7 illustrates an example communication system, in accordance with one embodiment. As illustrated, example system 500 includes data routing subsystem 502 and network interface module 504 coupled to each other as shown. Network interface module 504 is employed to optically coupled communication system 500 to a network, which may be a local area network, a wide area network, a telephone network, and so forth. These networks may be private and/or public. For the embodiment, network interface module 504 includes in particular, a component, e.g. an optoelectronic transmitter module, incorporated with one of the MEMS 102, 102′ and 102″ of FIG. 1–5. For the purpose this specification, network interface module 504 may also be referred to as a communication interface module.

Still referring to FIG. 7, for the embodiment, data routing subsystem 502 includes processor 512 and memory 514 coupled to each other as shown. Memory 514 has stored therein a number of data routing rules, according to which processor 512 routes data received through network interface module 504. The data routing rules may be stored employing any one of a number of data structure techniques, including but are not limited to e.g. tables, link lists, and so forth. The data may be received and forwarded in accordance with any one of a number of communication protocols, including but are not limited to e.g. the Transmission Control Protocol/Internet Protocol (TCP/IP).

In various embodiments, the tasks performed by processor 512 may include controlling the various drives of the MEMS 102, as well as controlling the elements to hold or lock down micro-object 414 after it has been moved to a desired operational location. Processor 512 may also cause the micro-object 414 to be "unlocked" from a location, and repeat the re-position and lock down process. The reposition/lock down process may be repeated any number of times as desired.

In alternate embodiments, the actual controlling may be delegated to one or more other controllers (not shown). That is, processor 512 effectuates the desired controls via these other controllers. Accordingly, for the claims, a processor may be referred to as a controller or vice versa, i.e. the terms are to be considered interchangeable, for the purpose of the present specification and claims.

Further, in various embodiments, data routing system 502 may also include one or more sensors (not shown) to collect one or more performance metrics of system 500. The sensors may also be coupled to processor 512 (or its agents, the "downstream" controllers, if applicable), to effectuate their controls (periodically or in real time), exclusively in view of the data collected for the performance metrics or in combination with other operational or configuration data. The sensors may be disposed anywhere in system 500, including but not limited to network interface module 504 (e.g. in MEMS 102).

Except for the incorporation of MEMS 102 with network interface module 504, elements 502–504 represent a broad range of these elements known in the art or to be designed In various embodiments, example system 500 may be a router, a switch, a gateway, a server, and so forth.

Accordingly, various embodiments of a MEMS having a drive arrangement equipped to provide a micro-object with 2 degrees of mobility, and a system incorporating one of such MEMS have been described. Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An electromechanical system comprising:
   a first compliant suspension beam;
   an object coupled to the first compliant suspension beam; and
   a first and a second drive coupled to a first and a second end of the first compliant suspension beam, and to be activatable complementarily to move, compress or extend the first compliant suspension beam, to provide the object with a first and a second degree of mobility.

2. The electromechanical system of claim 1, wherein the first and second drives are adapted to be complementarily activatable to move the first compliant suspension beam a distance along a first direction, to move the object a distance along the first direction.

3. The electromechanical system of claim 2, wherein the first and second drives are further adapted to be complementarily activatable to also compress or extend the first compliant suspension beam by an amount, to move the object for a distance along a second direction, orthogonal to the first direction, substantially concurrent with said movement of the object along the first direction.

4. The electromechanical system of claim 1, wherein
   the electromechanical system further comprises a second compliant suspension beam;
   the object is further coupled to the second compliant suspension beam; and
   the first and second drives are further coupled to a third and a fourth end of the second compliant suspension beam, and to be activatable complementarily to correspondingly move, compress or extend the second compliant suspension beam, in concert with the moving, compressing, or extending of the first compliant suspension beam.

5. The electromechanical system of claim 1, wherein the electromechanical system further comprises a third drive coupled to the first end of the first compliant suspension beam, and to be activatable complementarily with the second drive to move, compress or extend the first compliant suspension beam to complement the complementary activating of the first and second drives.

6. The electromechanical system of claim 1, wherein
   the first and second drives contribute to the provision of the first and second degrees of mobility in a first one or more complementarily activation manners; and
   the electromechanical system further comprises a third and a fourth drive coupled to the first and second ends of the first compliant suspension beam, and to be activatable complementarily with each other, to move, compress or extend the first compliant suspension beam, to contribute to the provision of the first and second degrees of mobility in a second one or more complementarily activation manners.

7. The electromechanical system of claim 1, wherein at least one of the first and second drives comprises two separately disposed disjoint sections.

8. The electromechanical system of claim 1, wherein the electromechanical system further comprises a stage attached to the first compliant suspension beam, and the object is disposed on the stage.

9. The electromechanical system of claim 8, wherein the electromechanical system further comprises
a substrate;
first and second springs disposed on the substrate, and coupled to the first and second drives respectively; and
the substrate further includes one or more regions to be activatable to attract and hold the stage, to render the object unmovable by the first and second drives.

10. The electromechanical system of claim 8, wherein the electromechanical system further comprises one or more features adapted to be activatable to attract and hold the stage, rendering the object unmovable by the first and second drives.

11. An electromechanical system comprising:
a first, a second, a third, and a fourth movable arm;
an object coupled to the first, second, third and fourth movable arms; and
a first, a second, a third, and a fourth drive correspondingly coupled to the first, second, third and fourth moveable arms, respectively, be complementarily activatable to each move in a selected one of a counterclockwise direction and a clockwise direction to move the first, second, third and fourth movable arms in a coordinated manner to provide the object with a first and a second degree of mobility.

12. The electromechanical system of claim 11, wherein the first and second drives are adapted to be activatable complementarily to move in a selected one of a counterclockwise direction and a clockwise direction, and the third and fourth drives are adapted to be activatable complementarily to move in the other one of the counterclockwise and clockwise directions, to move the object a distance, along a first direction.

13. The electromechanical system of claim 12, wherein the first, second, third and fourth drives are further adapted to be activatable complementarily to move the object for a distance, along a second direction, orthogonal to the first direction, substantially concurrent with said movement of the object along the first direction.

14. The electromechanical system of claim 11, wherein the first, second, third and fourth drives are further adapted to be activatable complementarily to move in a selected one of a counterclockwise direction and a clockwise direction, to move the object a distance, along a first direction.

15. The electromechanical system of claim 14, wherein the first, second, third and fourth drives are further adapted to be activatable complementarily to move the object a distance, along a second direction, orthogonal to the first direction, substantially concurrent with said movement of the object along the first direction.

16. The electromechanical system of claim 11, wherein the electromechanical system further comprises a stage coupled to the movable arms, and the object is disposed on the stage.

17. The electromechanical system of claim 16, wherein the electromechanical system further comprises a substrate having one or more regions adapted to be activatable to attract and hold the stage, to render the object unmovable by the drives.

18. The electromechanical system of claim 16, wherein the electromechanical system further comprises one or more features adapted to be activatable to attract and hold the stage, rendering the object unmovable by the drives.

19. A method comprising:
activating a first drive coupled directly to a first substantially elongated member; and
activating a second drive coupled directly to the first substantially elongated member in a manner complementary to said activating of the first drive to move, compress or extend the first substantially elongated member to provide an object with a first and a second degree of mobility, the first and second drives being different drives.

20. The method of claim 19, wherein
said complementary activating of the first and second drives is performed to provide primarily a selected one of the first and second degree of mobility; and
the method further comprises activating complementarily a third and a fourth drive coupled directly to the first substantially elongated member, in cooperation with said complementary activating of the first and second drives to move, compress or extend the first substantially elongated member to provide the object primarily with the other one of the first and second degrees of mobility, the first, second, third, and four drives being different drives.

21. The method of claim 19, wherein
said complementary activating of the first and second drives is performed to move the first substantially elongated member to provide a selected one of the first and second degree of mobility; and
the method further comprises activating complementarily a third and a fourth drive coupled directly to a second substantially elongated member, in cooperation with said complementary activating of the first and second drives to move the second substantially elongated member, in concert with said moving of the first substantially elongated member, the first, second, third, and four drives being different drives.

22. The method of claim 19, wherein the method further comprises rendering a stage to which the object is disposed, unmovable by the drives, to effectuating locking in place the object.

23. The method of claim 22, wherein the method further comprises undoing said rendering of the stage unmovable to render the object movable by the drives again.

24. The method of claim 23, wherein the method further comprises repeating said moving of the object, and effectuating locking in-place the object.

25. A system comprising:
a data routing subsystem including memory having a plurality of data routing rules, and a processor coupled to the memory to route data based at least in part on the data routing rules; and
a network interface module coupled to the data routing subsystem to optically forward data for the data routing subsystem, the network interface module including an electromechanical subsystem having
a plurality of substantially elongated members;
an object coupled to the plurality of substantially elongated members; and
a plurality of drives coupled to the substantially elongated members, and to be selectively activatable in selected combinations to move, compress or extend the substantially elongated members, to provide the object with a first and a second degree of mobility.

26. The system of claim 25, wherein
the plurality of substantially elongated members of the electromechanical system comprise a first and a second compliant suspension beam; and the plurality of drives of the electromechanical system comprise a first and a second drive coupled to first ends of the first and second compliant suspension beams, and a third and a fourth drive coupled to second ends of the first and second compliant suspension beams.

27. The system of claim 25, wherein the plurality of elongated members of the electromechanical system comprises a first, a second, a third, and a fourth movable arm; and the plurality of drives of the electromechanical system comprise a first, a second, a third, and a fourth drive correspondingly coupled to the first, second, third and fourth moveable arms, respectively.

28. The system of claim 25, wherein each of the drives is adapted to be activatable with an intensity that is different from activation intensities of the other drives.

29. The system of claim 25, wherein the electromechanical system further comprises a stage to which the object is attached; and a substrate having either a region or a feature disposed on the substrate activatable to attract and hold the stage, to render the object immoveable by the drives.

30. The system of claim 29, wherein the system further comprises one or more sensors to monitor one or more aspects of the system, which monitoring results are used exclusively or in combination with other inputs in determining said selective complementary activation of the drives of the electromechanical system.

* * * * *

UNITED STATES PATENT AND TRADEMARK OFFICE
CERTIFICATE OF CORRECTION

PATENT NO.         : 7,187,486 B2                                    Page 1 of 1
APPLICATION NO.  : 10/832655
DATED              : March 6, 2007
INVENTOR(S)        : Marc Epitaux et al.

It is certified that error appears in the above-identified patent and that said Letters Patent is hereby corrected as shown below:

Column 9
Line 24, [Claim 11.] "..., be complementarily..." should read --..., to be complementarily...--.

Signed and Sealed this

Eighteenth Day of August, 2009

David J. Kappos
*Director of the United States Patent and Trademark Office*